S. KAUFMAN.
PUNCTURE PROOF TIRE.
APPLICATION FILED APR. 5, 1919.

1,366,080.

Patented Jan. 18, 1921.

Inventor.
Samuel Kaufman
by Heard Smith & Tennant
Attys.

S. KAUFMAN.
PUNCTURE PROOF TIRE.
APPLICATION FILED APR. 5, 1919.

1,366,080.

Patented Jan. 18, 1921.
2 SHEETS—SHEET 2.

Inventor
Samuel Kaufman
by Heard Smith & Tennant
Attys.

UNITED STATES PATENT OFFICE.

SAMUEL KAUFMAN, OF BOSTON, MASSACHUSETTS.

PUNCTURE-PROOF TIRE.

1,366,080.   Specification of Letters Patent.   Patented Jan. 18, 1921.

Application filed April 5, 1919. Serial No. 287,758.

*To all whom it may concern:*

Be it known that I, SAMUEL KAUFMAN, a citizen of the United States, residing at Boston, county of Suffolk, State of Massachusetts, have invented an Improvement in Puncture-Proof Tires, of which the following description, in connection with the accompanying drawing, is a specification, like characters on the drawing representing like parts.

This invention relates to armored pneumatic tires and has for its object to provide an improved pneumatic tire of this type which has various novel features all as will be more fully herein set forth.

In order to give an understanding of my invention I have illustrated in the drawings some selected embodiments thereof which will now be described after which the novel features will be pointed out in the appended claims;

Figure 1:
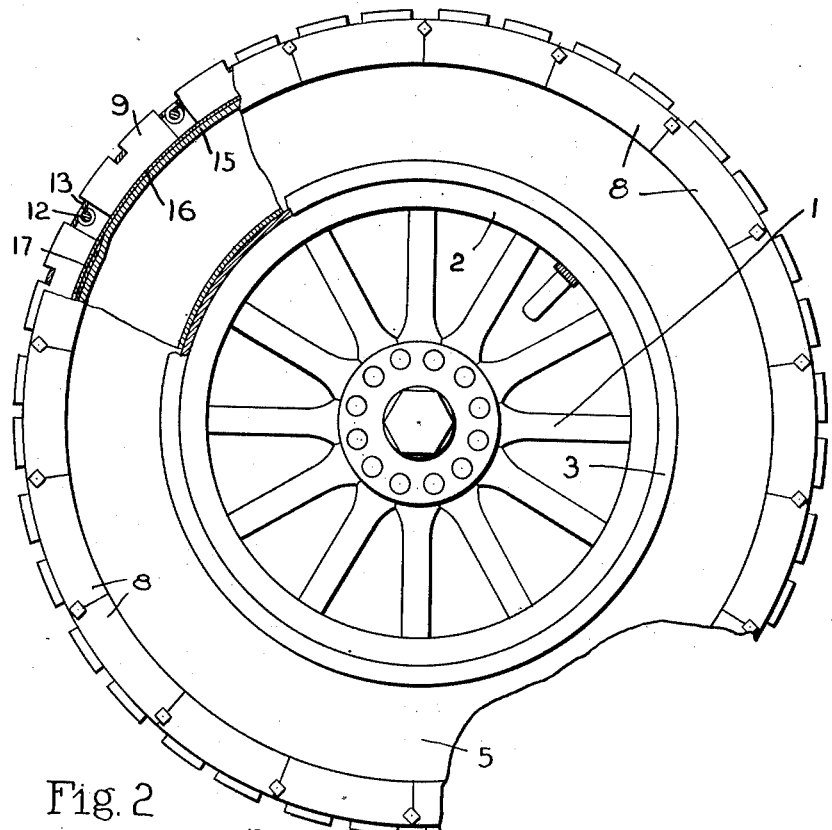
Figure 1 is a side view with part broken out showing one form of my invention.

My improved tire comprises two resilient side members which are adapted to be secured to the wheel rim in any usual way, an articulated tread member of novel construction, an inner tube confined between the two side members and the tread member, and an armor member interposed between the tread member and the side member, said armor member operating to protect the inner tube from being punctured.

In the drawings, 1 indicates generally an automobile wheel having the usual wooden felly 2 and the metal rim 3 which is herein shown as in the form of a clencher rim, it having the two clencher sides 4, although the rim 3 may be constructed to receive a so-called straight side tire or any other form of tire.

My improved tire comprises the two side members 5, each having at its inner edge a bead 6 to be engaged by the clencher flanges 4 and also having at its upper edge a similar bead 7 which has engagement with the tread member. These side members 5 can be made in any suitable way and of any suitable material, but will preferably be constructed of rubber and fabric. The tread member comprises a plurality of pairs of connected side plates 8, said pairs being pivotally connected together to make an articulated structure and a tread block 9 interposed between each pair of side plates, said tread block projecting beyond the side plates to form the tread surface. The tread blocks 9 will preferably be made of rubber and I propose to employ means for reinforcing each tread block.

Figure 2:
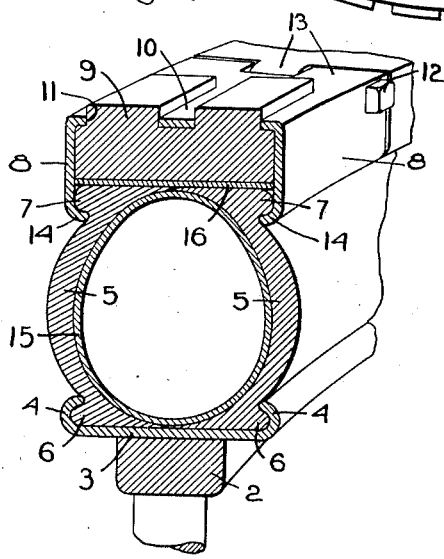
Fig. 2 is a sectional perspective view through the tire shown in Fig. 1.

In the structure shown in Figs. 1 and 2, the side plates 8 of each pair are connected by the bridging member 10, the construction being such that the side member and bridge member may be formed from a single sheet of metal. This bridge member 10 is provided with apertures 11 through which projections on the tread block 9 extend and the bridge 10 thus acts to reinforce the rubber tread block 9.

The various pairs of side plates 8 are shown as pivotally connected at 12 and while this may be accomplished in various ways I have shown in Figs. 1 and 2 a structure wherein the meeting ends of the bridge portions 10 of the tread sections are provided with eyes or loops 13 through which a pivotal pin 12 extends, this construction making a hinge connection between the tread sections.

The pivotal pins 12 are each provided with a head at one end and at the other end have a nut 71 screw-threaded thereto. Any suitable means for locking the nut from becoming loosened may be employed. I have herein shown a set-screw 72 for this purpose.

The side plates 8 are each provided with a clencher flange or edge 14, said clencher flanges embracing the beads 7 of the side members 5. The construction of the beads and of the clencher is such as to make a water-tight joint which will not admit of water or dirt working into the interior of the casing. When the tread member is assembled with the side members an articulated structure is produced which will give full play to the resiliency of the pneumatic tire.

15 indicates an inner tube which may have any suitable or usual construction and which is confined between the side members 5 and the tread member. In order to make the tire non-puncturable I propose to employ an armor member between the tread member and the side members. In Fig. 1 this armor member is shown as a strip of metal 16 which is situated between the beads 7 and the tread blocks 9 and extends from one series of side plates 8 to the other. This strip of metal extends clear around the tire and is arranged with overlapping ends as shown at 17 Fig. 1. The metal is flexible so that it will readily yield and thus will not detract from the resiliency of the tire.

Figure 4:
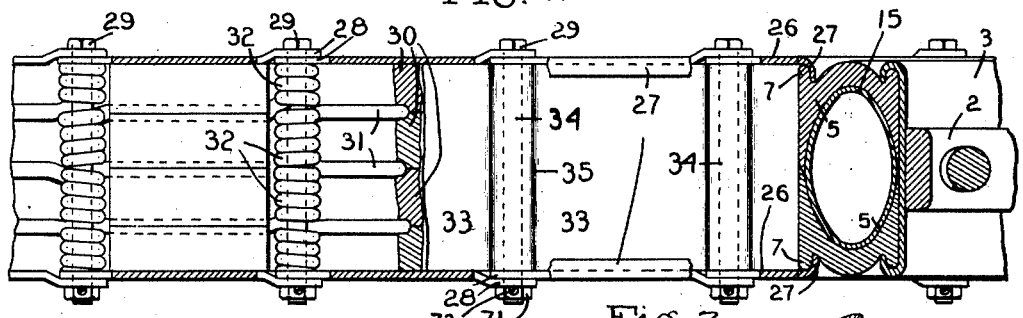
Fig. 4 is a section on substantially the line 6—6 Fig. 3.
Figures 3, 7:
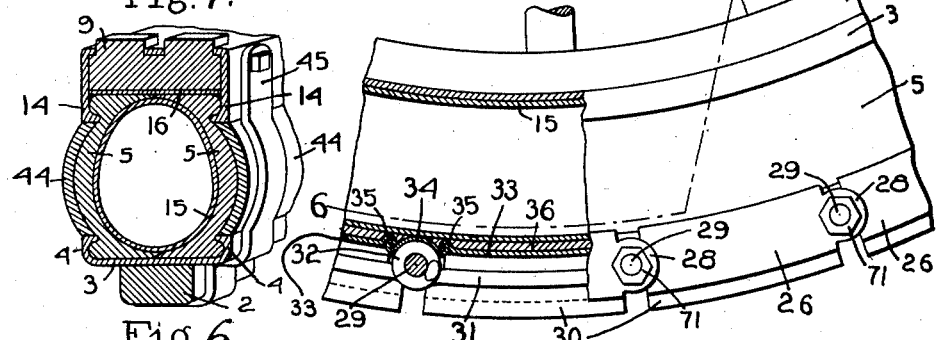
Fig. 3 is a fragmentary view showing a still different embodiment of the invention.
Fig. 7 shows still another form of the invention.

In Figs. 3 and 4 I have illustrated a form of invention wherein the armor member is sectional instead of a continuous strip. This embodiment contains the side members 5 as illustrated in Figs. 1 and 2 and the articulated tread member. This tread member comprises the pairs of said plates 26 which are formed with the clencher edges 27 to embrace the beads 7 of the side members 5. In this embodiment all the side members 26 on each side of the tire are pivoted together to form a link structure.

The side plates 26 are shown as provided with overlapping ears 28 which are pivotally connected by the pivotal pins 29 said pins extending clear across the tread member so that each pin pivotally connects the side plates on both sides of the tread member. The overlapping ears 28 are shaped to provide a smooth interior surface.

The rubber block in this embodiment is shown as made in sections 30 and these sections are reinforced by the wire reinforcing structure indicated generally at 31. This comprises wire which is bent to form coils 32 that encircle the pivotal pins 29 and also to form arms or sections 31 that extend between the coils. The sections 31 constitute a support for the blocks 30 and the blocks project through the space between the sections 31 thereby to form the tread surface. The side plates 26 are also provided on their outer edges with the inwardly-extending lips 62 which engage the outside blocks 30 and hold them in position.

The armor member is made in the sections 33 and 34, the sections 34 being shaped to cover the joint between the tread sections and the sections 33 extending the length of each tread section. These armor sections 33 and 34 have interlocking lips 35 at their meeting edges which permit the sections to turn slightly relative to each other and thereby permit the desired flexibility of the tire. I may if desired interpose some stuffing material 36 between the armor member and the inner tube 15 although this is not essential.

Figure 6:
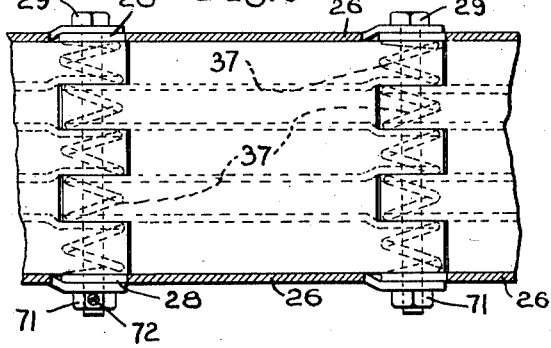
Fig. 6 is a section on the line 8—8, Fig. 5.
Figure 5:
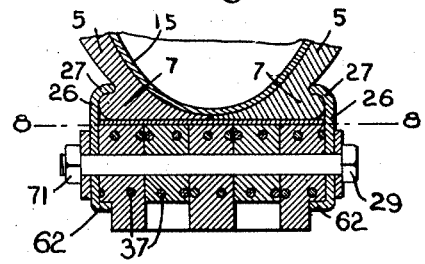
Fig. 5 is a transverse section through the tread portion of a tire showing a still different embodiment of the invention.

In Figs. 5 and 6 I have illustrated a slightly different construction, wherein the reinforcing wire is embedded in the rubber block, said block being molded about the wire. With this construction the coils of the wire indicated at 37 may be more open than they are in Fig. 4 so as to permit the rubber to fill the space between the turns of the coil.

The construction shown has this further advantage that it is possible to convert the tire from a pneumatic tire into a solid tread tire. This can be accomplished by employing two metal side members 44 which can be of any desired shape and which are placed between the clencher flanges 4 on the metal rim 3 and the clencher flanges 14 on the tread member, as seen in Fig. 7. In order to insert these metal spacing plates it will be necessary to open the tread member at one of its hinges, said tread members being united again after the spacing plates are in position. When the tire is pumped up it will have the effect of a solid tire rather than of a pneumatic tire.

While I have thus described my invention, it will be understood that it may be embodied in other forms and constructions within the meaning of the claims which follow.

One advantage of my invention is that the individual tread blocks can be removed when they become worn and can be replaced by new blocks.

The articulated tread member herein illustrated can also be used on an ordinary pneumatic tire by simply placing the tread member around the periphery of the tire and then providing suitable means for strapping it to the tire.

The links 8 may be made of any suitable metal, but I will preferably employ some metal which is of a non-corrosive nature. Aluminum steel or an alloy of aluminum makes a light link which will not easily corrode.

The construction herein shown provides a tread surface which has the advantage that it will not readily skid in either direction.

Having thus described my invention what I claim as new and desire to secure by Letters Patent is;

1. In a pneumatic tire, the combination with a body portion, of an articulated tread member composed of a plurality of sections hinged together, each section comprising side plates, pivot pins connecting the side plates, rubber blocks interposed between the side plates, a plurality of wires coiled around each pivot pin and having the ends extending between the side plates and forming a support and reinforcement for the rubber blocks.

2. In a pneumatic tire, the combination with a body portion, of an articulated tread member composed of a plurality of sections hinged together, each section comprising side plates, pivot pins connecting the side plates, rubber blocks interposed between the side plates, a plurality of wires coiled around each pivot pin and having the ends extending between the side plates and forming a support and reinforcement for the rubber blocks, an inner tube within the body portion, and an armor member situated between said inner tube and the rubber blocks, said armor member comprising short sheet metal sections overlying the coiled portions of the wires and longer sheet metal sections connecting the shorter sections, each section having lips at its ends to engage lips on the next adjacent section.

In testimony whereof, I have signed my name to this specification.

SAMUEL KAUFMAN.